United States Patent [19]
Wright

[11] Patent Number: 5,820,082
[45] Date of Patent: Oct. 13, 1998

[54] HOLDING ELEMENT

[75] Inventor: John O. Wright, York, Pa.

[73] Assignee: Osram Sylvania Inc., Danvers, Mass.

[21] Appl. No.: 697,358

[22] Filed: Aug. 23, 1996

[51] Int. Cl.$^6$ ...................................................... F16L 3/08
[52] U.S. Cl. .......................... 248/65; 248/68.1; 248/71; 248/73; 248/74.1; 248/74.2
[58] Field of Search ................ 248/65, 68.1, 71, 248/73, 74.1, 74.2

[56] References Cited

U.S. PATENT DOCUMENTS

| | | | |
|---|---|---|---|
| 3,465,992 | 9/1969 | Schuplin | 248/71 |
| 3,473,768 | 10/1969 | Piasecki | 248/71 X |
| 3,632,070 | 1/1972 | Thayer | 248/68.1 |
| 5,024,405 | 6/1991 | McGuire | 248/71 X |
| 5,129,607 | 7/1992 | Satoh | 248/73 |
| 5,230,489 | 7/1993 | White et al. | 248/73 X |
| 5,277,387 | 1/1994 | Lewis et al. | 248/71 X |
| 5,390,876 | 2/1995 | Hatano et al. | 248/68.1 X |

*Primary Examiner*—Carl D. Friedman
*Assistant Examiner*—W. Glnn Edwards
*Attorney, Agent, or Firm*—William H. McNeill

[57] ABSTRACT

A holding element which secures a cable or a bundle of wires in place relative to a surface. The holding element includes a retainer which grasps the bundle of wires and a mounting unit which is attached to the surface. The mounting unit is moveable relative to the retainer so that the mounting unit can be moved, to properly position it at the surface location where it is to be affixed, without moving the retainer relative to the bundle of wires.

18 Claims, 3 Drawing Sheets

HOLDING ELEMENT

TECHNICAL FIELD

The present invention relates to a holding element for securing an article in place. For example, the present invention is particularly useful in providing a holding element which includes a retainer for use with a wire bundle and a mounting device for securing the retainer in place relative to a surface of an automobile.

BACKGROUND ART

A holding element for use in securing in place articles such as, for example, one or more wires, typically includes (a) a retainer such as, for example, a clamp which grasps the article(s) and (b) a mounting device which attaches the retainer to a surface. In one example, and without limitation, such a holding element is used in the automobile industry to hold a wire bundle together and in place relative to a surface of the automobile. Typically, such a holding element is attached to a surface of the automobile located, for example, in the area under the hood. One known conventional holding element includes a mounting device in the form of an insert-like plug which is adapted to be inserted into an opening in a surface of the automobile and held in place by the interrelationship between the edge of the opening and resilient stacked and spaced gripping elements which form the mounting device. An example of such a holding element is described in U.S. Pat. No. 5,161,759. This patent describes a wire bundle holding element which includes (a) a retainer such as a clamp in the form of hinged U-shaped portions which can be releasably closed to clamp a bundle of wires between a deflectable pair of spreadable wings and (b) a mounting device in the form of what is generally referred to as a Christmas tree fastener. In use, the Christmas tree fastener is pushed into a suitable hole in the body of an automobile in the usual manner to hold the holding element in place. In holding elements of this type, the bundle clamp of the holding element is attached to a wire bundle and then the Christmas tree mounting device is attached to the automobile. When attaching the Christmas tree to the automobile it is necessary for the mounting device to be in alignment with the hole in the body of the automobile, in order to insert the mounting device therein and hold the holding element in place. If such alignment does not exist it is necessary to move the retainer or clamp along the length of the wire bundle until such alignment exists. In those instances where the clamp tightly grasps the bundle, it will be difficult, if possible, to move the clamp in this manner without first opening the clamp. This is an undesirably timely assembly step.

DISCLOSURE OF THE INVENTION

It is an object of the present invention to provide an improved holding element for use in securing articles in place.

It is another object of the present invention to provide such an improved holding element which includes a retainer and a mounting device which may be readily moved relative to such retainer to facilitate alignment of the mounting device with the area to which the mounting device is to be mounted.

It is a further object of the present invention to provide such an improved holding element wherein its mounting device may be moved relative to an article to which its retainer is secured without unfastening the retainer relative to the article.

Yet another object of the present invention is to provide such an improved holding element having a mounting device which may be quickly and easily aligned with the area to which it is to be secured.

Another object of the present invention is to provide an improved wire bundle holding element for use in an automobile, the holding element including a clamp and a mounting device which may be readily moved relative to such clamp to facilitate alignment of the mounting device with the area to which the mounting device is to be mounted.

A further object of the present invention is to provide an improved method for securing an article in place relative to a support surface.

This invention achieves these and other objects by providing a holding element for securing at least one article in place relative to a surface, comprising a retainer attachable to the article and a mounting unit attached to the retainer and attachable to the surface, the mounting unit being moveable relative to the retainer. The retainer comprises an article engaging inner surface and an outer surface, the outer surface comprising at least one pair of slide members including at least a first slide member and an opposing second slide member. The mounting unit is attached to the retainer, for sliding movement relative thereto, by being extended between the first slide member and the second slide member. The mounting device comprises a first stop member which is located at one end thereof and a second stop member which is located at an opposite end thereof. The mounting device is slidable relative to the retainer between one position where the first stop member engages an outer end of at least one slide member nearest one end of the mounting member, and another position where the second stop member engages an outer end of at least one slide member nearest the opposite end of the mounting member.

A method of securing at least one article in place relative to a surface is also disclosed herein.

BRIEF DESCRIPTION OF THE DRAWINGS

This invention may be clearly understood by reference to the attached drawings in which.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
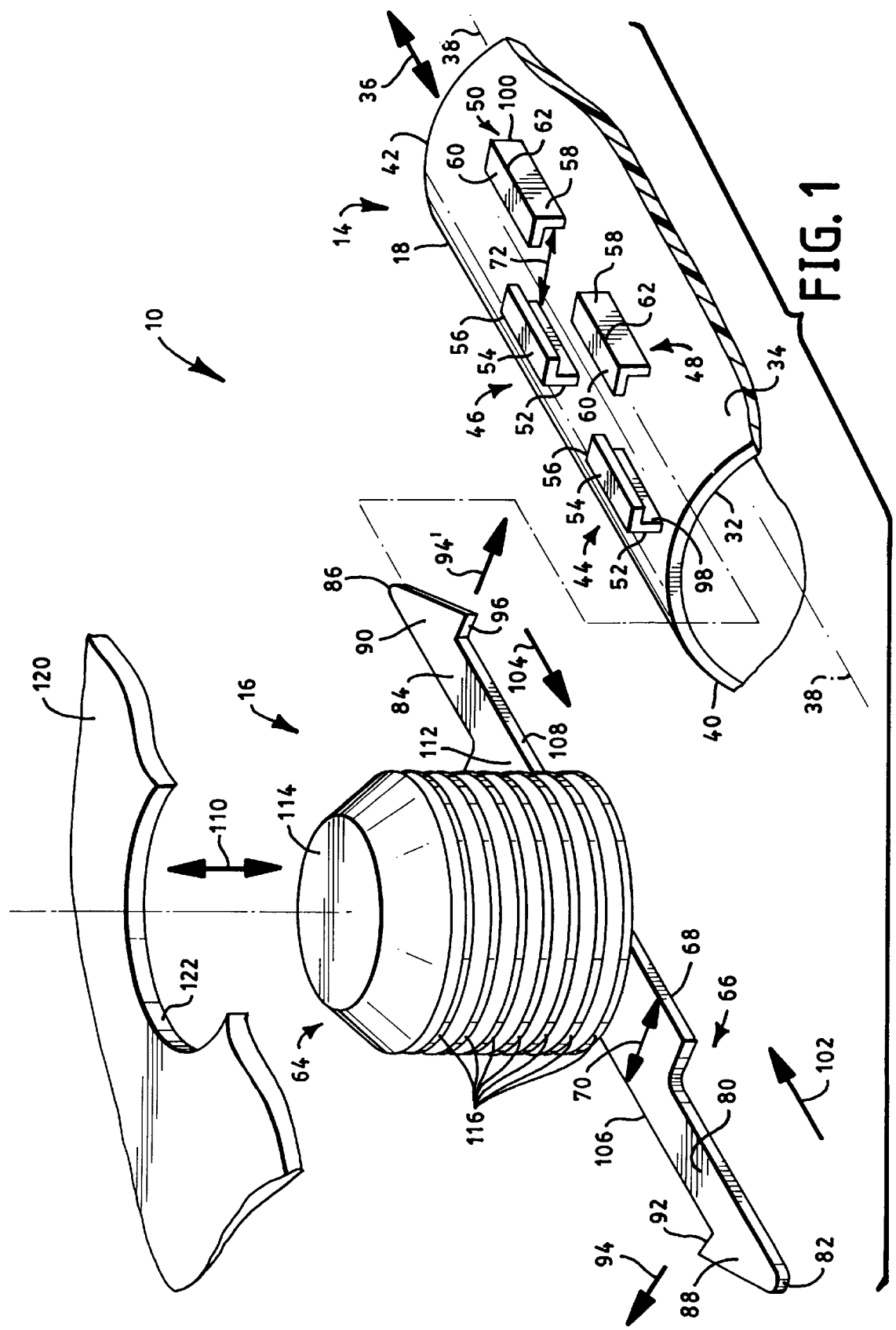
FIG. 1 is an exploded perspective view of a portion of a holding element of the present invention and the surface to which the holding element is attached.
Figure 2:
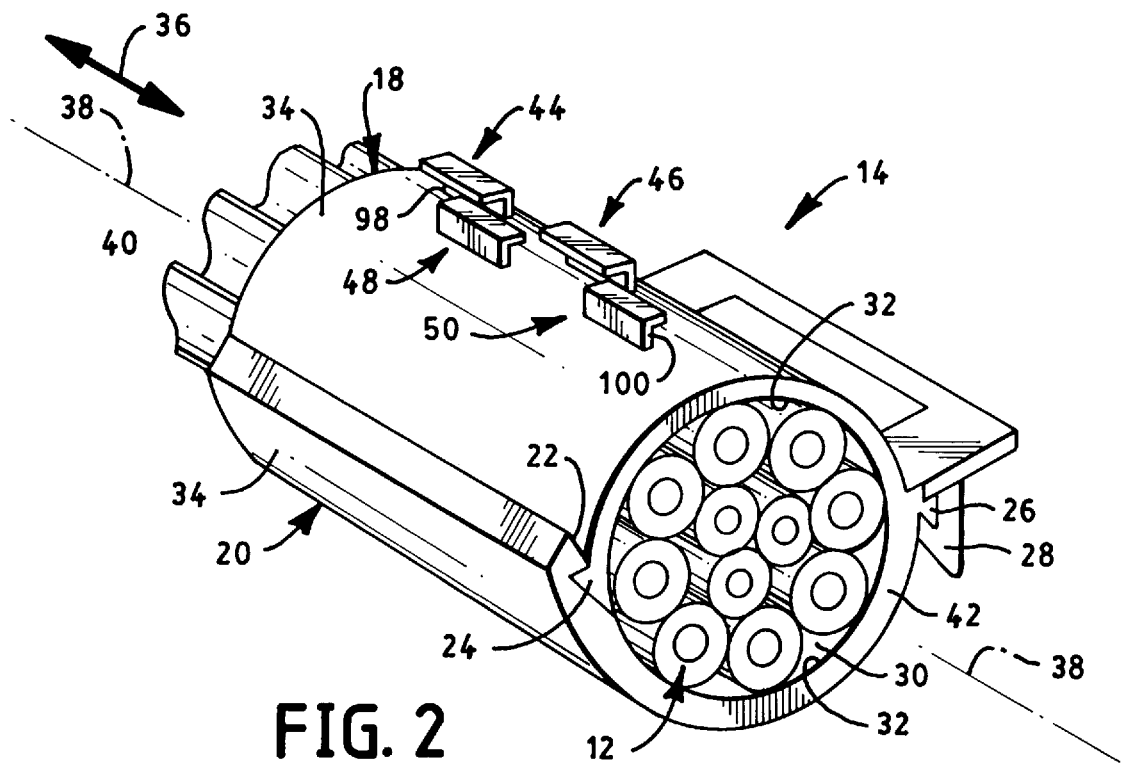
FIG. 2 is a perspective view of the retainer of the holding element of FIG. 1.

The embodiment of this invention which is illustrated in FIGS. 1 and 2 is particularly suited for achieving the objects of this invention. FIG. 1 depicts a holding element for securing an article in place. For example, and without limitation, FIG. 1 depicts a holding element for use in securing in place one or more wires. In particular, a holding element 10 is provided for use in securing in place a wire bundle 12. The word "bundle" is used herein to refer to two or more wires. Holding element 10 comprises a retainer 14 and a mounting device 16.

In the embodiment of FIGS. 1 and 2, retainer 14 comprises mating semicylindrical components 18 and 20 which may be connected together at mating connecting pairs of edges 22, 24 and 26, 28 to secure the wire bundle 12 in the cavity 30 formed by the components 18 and 20 when they are snapped together.

Components 18 and 20 are connected together to form an article engaging inner surface formed by opposing inner surfaces 32 and an opposite outer surface formed by outer surfaces 34. Retainer 14 extends in the direction 36 of a longitudinal axis 38 from a first end 40 to an opposite second end 42.

The opposite outer surface of the retainer comprises at least one pair of slide members including at least one first slide member and at least one opposing second slide member, the mounting unit being attached to the retainer by being mated between the first and second slide members. For example, in the embodiment of FIGS. 1 and 2, the outer surface of the retainer comprises two pairs of slide members including a first pair of first slide members including slide members 44 and 46 and an opposing second pair of second slide members including slide members 48 and 50. Each slide member extends in the direction 36 of longitudinal axis 38. The first slide members alternate with the second slide members in the direction 36. For example, as best seen in FIG. 1, the slide members alternate (slide member 44, slide member 48, slide member 46, and slide member 50) from end 40 to end 42 in the direction 36.

In the embodiment of FIGS. 1 AND 2, each first slide member 44, 46 of the first pair of slide members includes a leg 52 which extends in a first plane which is normal to the outer surface 34 of retainer 14 and another leg 54 which extends from a distal end 56 of a respective leg 52 towards the opposing second pair of slide members. Similarly, each second slide member 48, 50 of the second pair of slide members includes a leg 58 which extends in a second plane which is normal to the outer surface 34 of retainer 14 and another leg 60 which extends from a distal end 62 of a respective leg 58 towards the first pair of slide members.

The mounting device 16 comprises a first component 64 and an elongated member 66, the elongated member extending in the direction 36 of the longitudinal axis 38. Mounting device 16 mates with the first pair of slide members 44, 46 and the second pair of slide members 48, 50. For example, in the embodiment of FIGS. 1 and 2, the elongated member 66 comprises a central length 68 which has a width 70 which is about equal to, or somewhat less than, a normal distance 72 between the vertical plane in which each leg 52 extends and the vertical plane in which each opposing leg 58 extends. In this manner, the central length 68 can be held between the first pair of legs 44, 46 and the second pair of legs 48, 50 in such a manner that the mounting device 16 will be slidable relative to the retainer.

The elongated member 66 includes a first stop member located between the first component 64 and an end of the elongated member, and a second stop member located between the first component 64 and an opposite end of the elongated member. Such stop members limit the sliding of the mounting device relative to the retainer 14 between one position where the first stop member engages at least one outer slide member of the first pair of slide members and another position where the second stop member engages at least one outer slide member of the second pair of slide members. For example, in the embodiment of FIGS. 1 and 2, the elongated member 66 comprises a first end length 80 which extends from the central length 68 to an end 82 and a second end length 84 which extends from the central length 68 to an opposite end 86. In this embodiment, a first stop member 88 is located at the end 82 and a second stop member 90 is located at the end 86. Stop member 88 comprises a stop surface 92 which extends normal to and away from the longitudinal axis 38 in a first direction 94. In a like manner, stop member 90 comprises a stop surface 96 which extends normal to and away from the longitudinal axis 38 in an opposite second direction 94'. In use, surfaces 92 and 96 may engage respective abutment surfaces 98 and 100 of respective slide members 44 and 50 when the mounting device is caused to slide relative to retainer 16 in directions 102 and 104, respectively.

In the embodiment of FIGS. 1 and 2, the first end length 80 and the second end length 84 are each narrower in width than the central length 68. The first length 80 has an edge 106 which engages and is slidable in directions 102 and 104 relative to at least one leg 52. Similarly, the second length 84 has an edge 108 which engages and is slidable in directions 102 and 104 relative to at least one leg 58.

Figure 3:
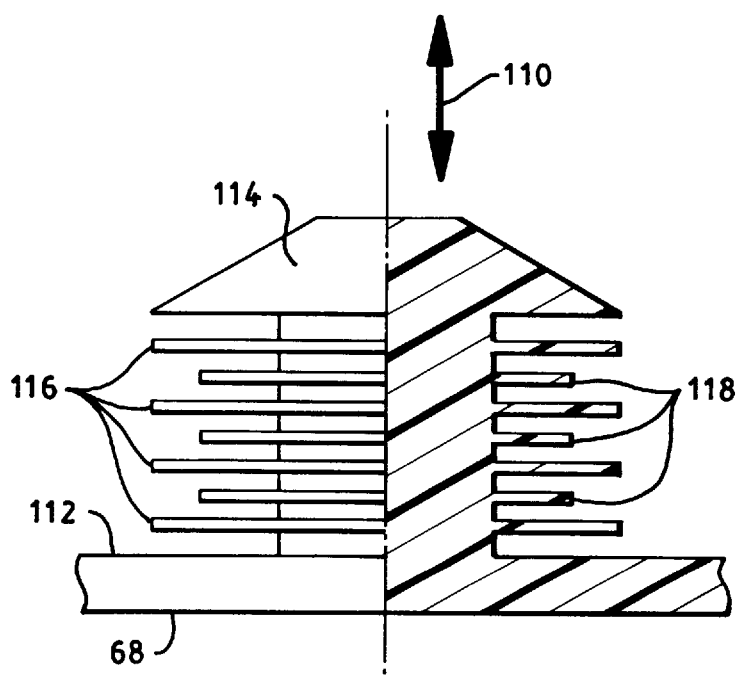
FIG. 3 is a partial sectional view of an alternative mounting device of the present invention.
Figure 4:
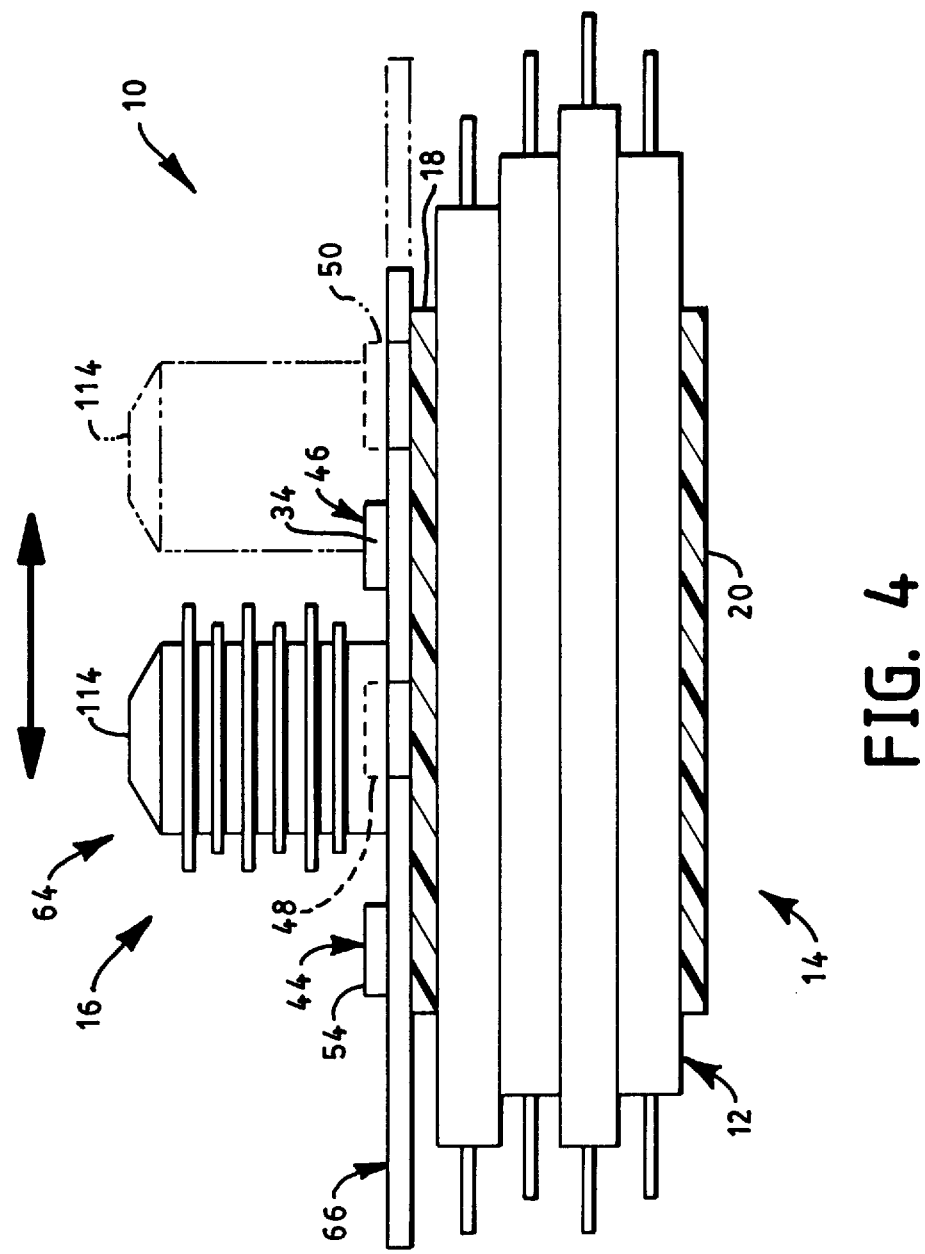
FIG. 4 is a sectional elevational view of the assembled holding element, including a moved position in phantom lines.

In the embodiment of FIGS. 1 and 2, the central length 68 is centered between end 82 and end 86. As depicted in FIG. 1, the first component 64 comprises a post which extends in a direction 110 normal to an upper surface 112 of the central length 68, the post being centered relative to such upper surface. The post includes a resilient cap 114 and a plurality of spaced, resilient fins 116 which are disposed between the cap and the surface 112 of the central length 68. The fins 116 are concentric to and extend away from the vertical axis of the post. The cap 114 and each fin 116 have the same diameter. The alternative embodiment of FIG. 3 depicts a similar post which is identical to the post of FIG. 1, with the exception that the fins are stepped. To this end, fins 116, 118 are provided, fins 116 having a diameter equal to that of cap 114 and greater than that of alternating fins 118, fins 118 and 120 alternating in direction 110 to provide a stepped effect.

In use, an article such as a bundle of wires 12 is inserted between surfaces 32 of the components 18, 20 of retainer 14, the semi-cylindrical components then being snapped together at the connecting edges 22, 24 and 26, 28 so that the bundle is firmly clamped within cavity 30. The holding element 10 is then positioned in the vicinity of the general area of the surface 120 to which the holding element is to be secured. The user then slides the mounting unit 16 relative to the retainer 14 in the direction 102 or 104 to thereby align the mounting unit with the specific area to which the holding element is to be secured. In particular, the central length 68 is caused to slide relative to slide members 44, 46, 48 and 50 in direction 102 or 104, depending upon whether the mounting unit 16 must be moved to the right or left (viewing FIG. 1) in order to provide the required alignment. The mounting unit 16 may be caused to slide in direction 102 until the stop surface 92 engages the abutment surface 98 of the stop member 44 and may be caused to slide in direction 104 until the stop surface 96 engages the abutment surface 100 of stop member 50. Such interrelationship between the stop surfaces and their respective abutment surface provides the maximum distance the mounting unit 16 may be moved in directions 102 and 104. In the embodiment depicted in FIG. 1, alignment will be completed when the user slides the central member 68 sufficiently so that the first component 64 is in vertical alignment with the hole 122 which identifies the area of the surface 120 at which the holding element is to be affixed. The first component 64 is then force fit into hole 122 in the usual manner to affix the holding element 10 to the surface 120.

Fabrication of the various components described herein may be accomplished using conventional procedures. For example, the retainer and mounting device may be molded from a plastic material such as, without limitation, nylon or polypropylene.

The embodiments which have been described herein are but some of several which utilize this invention and are set forth here by way of illustration but not of limitation. It is apparent that many other embodiments which will be readily apparent to those skilled in the art may be made without departing materially from the spirit and scope of this invention.

What is claimed is:

1. A holding element for securing at least one article in place relative to a surface, comprising:
   a retainer attachable to said article, said retainer comprising an article engaging inner surface and an outer surface, said outer surface comprising at least one pair of slide members including a first slide member and a spacedly opposing second slide member; and
   a mounting unit attached to said retainer and attachable to said surface, said mounting unit being moveable relative to said retainer and being attached to said retainer by mating between said first slide member and said second slide member.

2. The holding element of claim 1 wherein said mounting device comprises a first component attachable to said surface, and an elongated member attached to said first component and mated between said first slide member and said second slide member.

3. The holding element of claim 2 wherein said elongated member comprises a first stop member located between said first component and one end of said elongated member and a second stop member located between said first component and an opposite end of said elongated member, said mounting device being slidable relative to said retainer between one position where said first stop member engages an outer end of at least one slide member nearest said one end and another position where said second stop member engages an outer end of at least one slide member nearest said opposite end.

4. The holding element of claim 3 wherein said first slide member includes a first leg which extends in a first plane which is normal to said outer surface and a second leg which extends from a distal end of said first leg towards said second slide member and further wherein said second slide member includes a third leg which extends in a second plane which is normal to said outer surface and a fourth leg which extends from a distal end of said third leg toward said first slide member.

5. The holding element of claim 4 wherein said elongated member comprises a central length having a width about equal to a normal distance between said first plane and said second plane, said central length being held between said first leg and said third leg for slidable movement of said mounting device relative to said retainer.

6. The holding element of claim 5 wherein said elongated member extends in a longitudinal direction and comprises a first end length which extends in said longitudinal direction from said central length to said one end and a second end length which extends in said longitudinal direction from said central length to said opposite end, said first stop member being located at said one end and comprising a first stop surface extending in a direction normal to and away from said longitudinal direction in a first direction, and said second stop member being located at said opposite end and comprising a second stop surface extending in a direction normal to and away from said longitudinal direction in an opposite second direction.

7. The holding element of claim 6 wherein said mounting device comprises a post which extends in a direction normal to an upper surface of said central length, and further comprises a plurality of fins which are concentric to and extend away from said post, said post being centered relative to said upper surface.

8. The holding element of claim 7 wherein said fins are stepped.

9. A holding element for securing at least one article in place relative to a surface, comprising:
   a retainer having an article engaging inner surface and an opposite outer surface, said retainer extending in the direction of a longitudinal axis from a first end to an opposite second end, said opposite outer surface comprising a first pair of first slide members each first slide member extending in said direction, and a second pair of spacedly opposing second slide members, each second slide member extending in said direction, said first slide members alternating with said second slide members in said direction; and
   a mounting device comprising a first component and an elongated member, said elongated member extending in said direction and mating with said first pair of first slide members and said second pair of opposing second slide members, said elongated member having a first stop member located between said first component and one end of said elongated member and a second stop member located between said first component and an opposite end of said elongated member, said mounting device being slidable relative to said retainer between one position where said first stop member engages an outer slide member of said first pair and another position where said second stop member engages an outer slide member of said second pair.

10. The holding element of claim 9 wherein each slide member of said first pair includes a first leg which extends in a first plane which is normal to said opposite outer surface and a second leg which extends from a distal end of said first leg towards said second pair; and further wherein each slide member of said second pair includes a third leg which extends in a second plane which is normal to said opposite outer surface and a fourth leg which extends from a distal end of said third leg toward said first pair.

11. The holding element of claim 10 wherein said elongated member comprises a central length having a width about equal to a normal distance between said first plane and said second plane, said central length being held between said first legs and said third legs for said slidable movement of said mounting device relative to said retainer.

12. The holding element of claim 11 wherein said elongated member comprises a first end length which extends from said central length to said one end and a second end length which extends from said central length to said opposite end, said first stop member being located at said one end and comprising a first stop surface extending in a direction normal to and away from said longitudinal axis in a first direction, and said second stop member being located at said opposite end and comprising a second stop surface extending in a direction normal to and away from said longitudinal axis in an opposite second direction.

13. The holding element of claim 12 wherein said first end length and said second end length are each narrower in width than said central length, said first end length having an edge which engages and is slidable relative to at least one first leg, and said second end length having an edge which engages and is slidable relative to at least one third leg.

14. The holding element of claim 13 wherein said central length is centered between said one end and said opposite end.

15. The holding element of claim 14 wherein said mounting device comprises a post which extends in a direction normal to said upper surface, and further comprises a plurality of fins which are concentric to and extend away from said post, said post being centered relative to said upper surface.

16. The holding element of claim 15 wherein said fins are stepped.

17. A method of securing at least one article in place relative to a surface using a holding element which comprises a retainer and a mounting unit slidably coupled to said retainer, comprising the steps of:

retaining said article in said retainer;

aligning said mounting unit with an area of said surface to which said holding element is to be secured by sliding said mounting unit relative to said retainer; and securing said mounting unit to said surface at said area.

18. The method of claim 17 wherein said article is a bundle of wires, said surface is a surface of an automobile, and said area is a hole in said surface, and further wherein said retaining step comprises the step of clamping said bundle of wires between opposing surfaces of said retainer, and said securing step comprises the step of force fitting a portion of said mounting unit into said hole.

\* \* \* \* \*